United States Patent
Boss et al.

(10) Patent No.: US 8,543,283 B2
(45) Date of Patent: Sep. 24, 2013

(54) TRACKING VEHICLE MAINTENANCE USING SENSOR DETECTION

(75) Inventors: Gregory J. Boss, American Fork, UT (US); Peter G. Finn, Brampton, CA (US); Rick A. Hamilton, II, Charlottesville, VA (US); Brian M. O'Connell, Cary, NC (US); James W. Seaman, Falls Church, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/609,360

(22) Filed: Sep. 11, 2012

(65) Prior Publication Data

US 2013/0006465 A1 Jan. 3, 2013

Related U.S. Application Data (60) Continuation of application No. 13/467,529, filed on May 9, 2012, now Pat. No. 8,311,698, and a division of application No. 12/245,804, filed on Oct. 6, 2008, now Pat. No. 8,209,076.

(51) Int. Cl.
*G01M 17/00* (2006.01)

(52) U.S. Cl.
USPC ......... 701/29.6; 701/29.4; 702/184; 705/305; 340/572.1; 340/568.1

(58) Field of Classification Search
USPC ............... 701/32, 35, 33, 29, 30, 1; 702/184; 705/305; 340/438, 572.1, 568.1
See application file for complete search history.

(56) References Cited

U.S. PATENT DOCUMENTS

| | | | |
|---|---|---|---|
| 5,995,898 A | 11/1999 | Tuttle | |
| 6,587,768 B2 | 7/2003 | Chene et al. | |
| 6,778,888 B2 | 8/2004 | Cataldo et al. | |
| 6,840,445 B2 | 1/2005 | Gatz | |
| 6,898,489 B1 | 5/2005 | Hayes, Sr. | |
| 6,982,653 B2 | 1/2006 | Voeller et al. | |
| 7,042,346 B2 | 5/2006 | Paulsen | |
| 7,400,268 B2 | 7/2008 | Wilbrink et al. | |
| 2009/0267765 A1* | 10/2009 | Greene et al. ............. | 340/568.1 |

OTHER PUBLICATIONS

U.S. Patent Application (filed Oct. 6, 2008), U.S. Appl. No. 12/245,804, Confirmation No. 4848.

(Continued)

*Primary Examiner* — Paul N Dickson
*Assistant Examiner* — Keith Frisby
(74) *Attorney, Agent, or Firm* — Patick J. Daugherty; Driggs, Hogg, Daugherty & Del Zoppo Co., LPA (57) ABSTRACT

Radio frequency identification is used in cooperation with the computer system aboard a motor vehicle to track service and maintenance activities relating to the vehicle. Each component or part of the vehicle that may require maintenance is provided with a unique passive identification tag. The output data from the tag is read by a reader placed in proximity to the tag, and the data is transmitted to an on-board computer module where it is processed, and the service record is updated. A data stream converter may be used to process the information read by the reader into a format that is acceptable to the on-board computer. The data from the on-board computer is stored in a device external to the computer. Provisions are included for notification to the user, the auto dealer or service other agency as needed.

17 Claims, 3 Drawing Sheets

(56) References Cited

OTHER PUBLICATIONS

U.S. Patent Application (filed May 9, 2012), U.S. Appl. No. 13/467,529, Confirmation No. 1036.

Notice of Allowance (mail date Jul. 7, 2012) for Patent Application (filed May 9, 2012), U.S. Appl. No. 13/467,529, Confirmation No. 1036.

* cited by examiner

TRACKING VEHICLE MAINTENANCE USING SENSOR DETECTION

CROSS REFERENCE TO RELATED APPLICATIONS

This application is a continuation of U.S. application Ser. No. 13/467,529, filed May 9, 2012, which is a divisional of application Ser. No. 12/245,804, filed Oct. 6, 2008, now U.S. Pat. No. 8,209,076, issued Jun. 26, 2012.

FIELD OF THE INVENTION

This invention relates to the use of radio frequency identification in cooperation with the computer system aboard a motor vehicle to track and record service and maintenance activities relating to the vehicle.

BACKGROUND OF THE INVENTION

It is common knowledge that a properly maintained motor vehicle is more dependable, safer, lasts longer, and increases the satisfaction of its owner as compared to a vehicle that is poorly maintained. Furthermore, following a good maintenance schedule helps to preserve the integrity of any warranty that the owner might have on the vehicle. In addition, the residual value of the vehicle is higher at the time of sale or trade-in. Accordingly, systems for implementing and improving the maintenance and repair of vehicles can be extremely beneficial to the owner, family members and others. The manufacturer of a vehicle typically provides a maintenance schedule that includes a recommended timetable or mileage schedule for tire rotation, engine tune-ups, lubrication, oil changes, front end alignments, radiator flushing, and the like. Failure to follow prescribed maintenance can seriously shorten the operative lifetime of the vehicle, and can adversely affect any applicable warranties on the vehicle itself or on the specific components.

SUMMARY OF THE INVENTION

In general, the present invention utilizes a device, such as an active RFID reader, coupled with a vehicle's computer system in conjunction with one or more sensors, such as passive RFID tags on or in proximity to vehicle components and parts, in order to track servicing of such components and parts.

In more detail, embodiments of the invention comprise system, methods, and program code useful in connection with a computer module typically mounted on board a motor vehicle for creating and updating a record of maintenance of said motor vehicle. Some embodiments comprise a sensor, such as a passive radio frequency tag associated with a serviceable or replaceable component of the vehicle and sensor, such as a radio frequency reader to capture a signal from said tag. Embodiments also employ circuitry to transmit the captured signal to a remote location such as the on-board computer module. A converter may be used for converting the signal from the reader into a data stream acceptable by the computer module. A service logic module may update a maintenance record with respect to the vehicle component that was the subject of the service or replacement. A non-volatile database storage may be used for retaining the information contained in the updated record provided by the service logic module. The system may also include a module for providing the user and/or other party (the mechanic, car rental agency, a financing company, etc.) with a status report, listing the repair or repairs that were made, the date or dates on which they were performed, a list of the replacement parts, a reminder of a scheduled maintenance item, or a warning of a maintenance default.

Aspects of the present invention also include computer executable program code stored in a computer readable medium installed on a motor vehicle where it can be deployed and executed on a computer system. Some examples of the program code comprise instructions which, when executed on a computer system, causes the computer system to: a) read input obtained from a detector associated with the motor vehicle relative to the onset and completion of maintenance or repair of the vehicle; b) transfer data from said detector to the computer system; c) update the maintenance record of the vehicle; and d) store the updated maintenance record in database storage. The program code may cause the input noted by the detector to be converted into a data stream that can be read by the computer system. The program code may cause a service logic module within the computer system to update vehicle maintenance records with respect to the data transmitted to the computer. In addition, the program code may cause a notification module to transmit a message with respect to the updated record.

BRIEF DESCRIPTION OF THE DRAWINGS

These and other features of this invention will be more readily understood from the following detailed description of the various aspects of the invention taken in conjunction with the accompanying drawings.

It should be understood that the drawings are intended to be merely schematic representations of the invention and its environment. They are not necessarily drawn to scale, nor are they intended to portray specific parameters of the invention. The drawings are intended to depict only typical embodiments of the invention, and therefore should not be considered as limiting the scope of the invention. In the drawings, like numbers represents like elements.

DETAILED DESCRIPTION OF THE INVENTION

The present invention utilizes existing active and passive RFID devices and tags in a system coupled by serial communication with existing vehicle computers in order to track and record vehicle service and maintenance. The system and method combine these technologies whereby vehicle service data is automatically detected and recorded.

Radio-frequency identification (RFID) is an automatic identification technique that relies on storing and remotely retrieving data using devices called RFID tags or transponders. An RFID tag is an object that can be attached to or incorporated into a product, animal, or person for the purpose of identification using radio waves. All RFID tags contain at least two component parts. One component is an integrated circuit (IC) for storing and processing information, modulating and demodulating a radio frequency (RF) signal and perhaps other specialized functions. The second component is an antenna for transmitting and receiving the signal. The RFID tag is in near proximity to the reader so that the tag can be read. The tag typically can be read by the reader from a distance of several meters, and does not necessarily need to be in the line of sight of the reader. The antenna can either be supported by the tag or can be located at a different location, and can be connected to the RFID integrated circuit by a cable.

Figure 1:
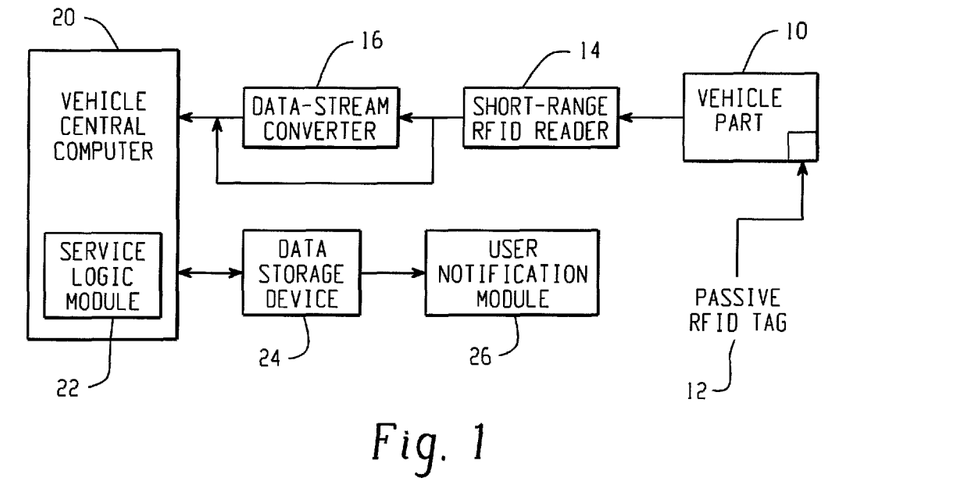
FIG. 1 is a block diagram depicting features of the present invention.

The operative elements of the present invention are shown in FIG. 1, wherein an automotive component or part 10 is embossed or otherwise equipped with a passive RFID tag 12. This tag is recognizable by a radio frequency reader such as an RFID reader 14. The RFID reader 14 obtains data from the passive tag. The data is translated in a data stream converter 16, if necessary, and updates the vehicle central computer 20 with associated component information. The data is then evaluated by a Service Logic Module 22 within the computer 20, and is written to a data storage device 24 comprising a nonvolatile storage medium. The database storage can either be external to the vehicle central computer as shown or can be embedded in the computer. Finally, optional user notification is processed in a user notification module 26. Each logical component will now be discussed in greater detail.

Figure 5:
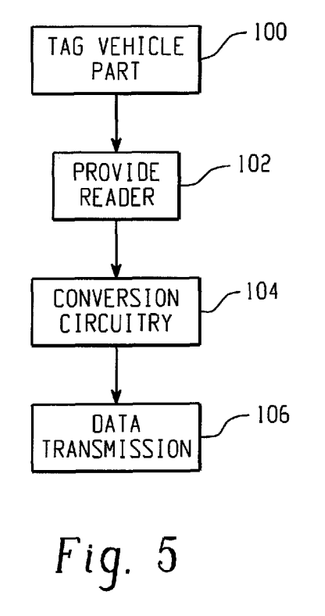
FIG. 5 shows preparatory steps of the present invention.

FIG. 5 shows the preliminary steps for the preparation of a vehicle in connection with the present invention. A vehicle part is provided with a tag such as an RFID tag at 100. A reader is positioned (102) in close proximity, e.g. within detection range typically of a few meters, on or in connection with the vehicle. It need not be mounted on the vehicle itself, but may be positioned so that the tag passes within the range of the reader as the vehicle moves by the reader. In other words, the reader may be mounted on the ground or floor over which the vehicle passes, or on the frame of a door through which the vehicle enters or exits a building or other structure. When the tag is read by the reader, suitable circuitry is used at 104 to convert the signal from the tag into data that can be then further used, recorded, stored or otherwise handled as appropriate. This data is then transmitted (106) to an on-board computer or to a remote location.

Figure 6:
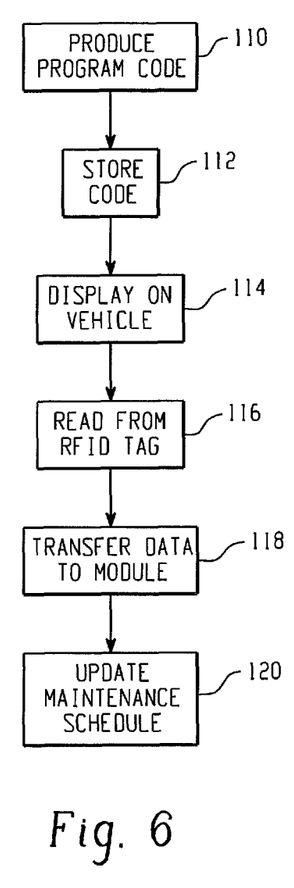
FIG. 6 is a flow chart illustrating the operational steps of the invention.

Turning next to FIG. 6, a typical flow diagram showing the operative steps for utilizing the present invention are shown. This is based on an installation of the component parts as described in connection with FIG. 5. A computer executable program code is produced (110) and the code is stored at 112 in a computer readable medium. This program code is then utilized at 114 by the on board computer system associated with a motor vehicle. The code contains instructions which will cause the computer to utilize a reader which obtains and reads data at 116 from a radio frequency tag associated with a tagged part of the motor vehicle. This data is transferred at 118 to the on board computer which can then update and store the information on a maintenance schedule at 120.

Passive RFID tags have greatly expanded in application and scope over the past several years. Passive tags are currently available in a wide variety of sizes, shapes, construction, application technique, and durability. These tags are marketed by a variety of suppliers which can be found on the internet and from product supply catalogs.

Figure 2:
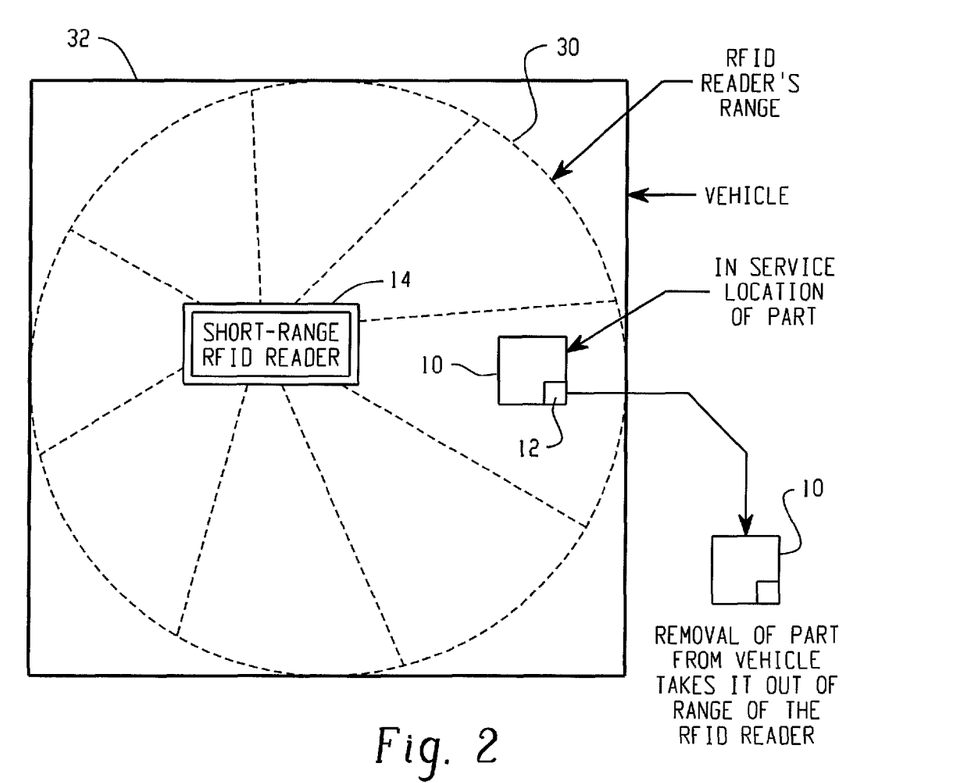
FIG. 2 is a diagram showing the field of range of an RFID reader.

FIG. 2 is a schematic representation of a typical RFID reader 14. As shown, this reader has a relatively short range represented by the dotted circle 30 surrounding the reader. The vehicle in which the reader is mounted is represented by the square box 32. A component part 10 is equipped with an RFID tag 12. When the component part is installed in the vehicle, the tag 12 is in near proximity to, and within the range of the reader. However, when the part 10 is removed from the vehicle 32, the tag 12 is shown as being outside of the RF range of the reader 30.

Virtually all physical components in a motor vehicle can be effectively labeled with passive RFID tags. All vehicle fluid containers and components which are included in regular service and maintenance or would reasonably be expected to be replaced within a certain time frame should be RFID tagged. The following lists provide a few examples of such fluids and components:

Regular Service Fluids and Associated Parts:
    Oil and oil filter
    Air filter
    Radiator fluid and filter
    Brake fluid
    Air conditioning charge
    Hoses
    Belts
    Brake pads
    Fuel-line filter

Reasonable Replacement components:
    Tires
    Thermostat
    Water pump
    Timing belt
    Spark plugs
    Spark plug wires
    Distributor cap
    Fuel pump
    Starter
    Brake rotors If a water pump is replaced, the water pump gasket should also be replaced as a part of that procedure. An association of these two components should be noted such that completion of service is not recorded unless both components are replaced.

The reader is a standard radio frequency reader such as an RFID tag reader, or multiple networked readers, and is well known in the art. Table 1 depicts use of the RFID reader to track component replacement of an oil filter. Each tag is identified with a unique 4 element code that correlates the tag with the component and its manufacturer.

TABLE 1

| RFID Tag ID | Component Description | Part Number |
|---|---|---|
| 53kjouGK1210alc3 | G.M. oil-filter | GK1210 |
| 42kjouFO4439iy2k | Ford oil-filter | FO4439 |

1. Manufacturer
2. Component type (oil-filter)
3. Component part/ID number
4. Component RFID tag number Data-stream Converter-It is possible that the Vehicle Central Computer would not natively understand the data-stream produced by the RFID reader. In this event, a data-conversion function would exist as an embedded or up-stream function between the RFID reader and the VCC. This is shown in FIG. 1 as component 16. In the event that a converter is not needed for a given reader system, the data stream can readily bypass the converter as shown.

The vehicle central computer is the standard computer module present in every modern vehicle. The module may contain a repair maintenance schedule for the vehicle. Otherwise, the schedule can be updated manually, either by the service technician, or by the vehicle owner.

The service logic module (SLM) typically may comprise an integral component of the vehicle central computer or may be separate. It serves to provide the logic to implement the present invention.

Figure 3:
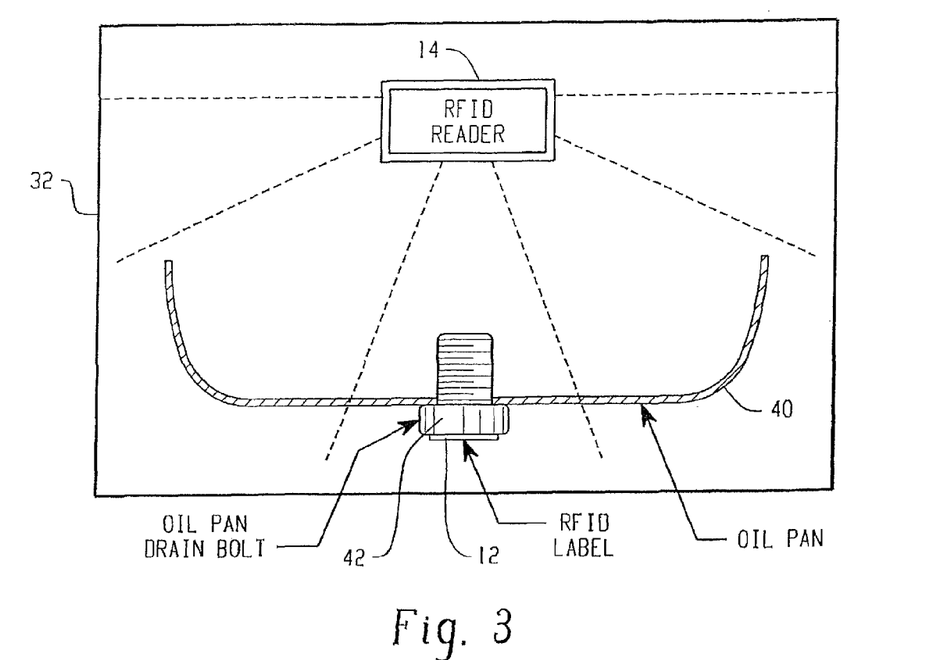
FIG. 3 is an example of an RFID reader detecting a label on an oil pan drain bolt.

The vehicle in-service component is detected by RFID reader whereupon the service logic module table is updated, optionally along with the vehicle's repair or service maintenance schedule, with component data as follows:

A component is removed or disconnected from the vehicle;

The RFID Reader detects loss of signal from the component;

response time is dependent upon the distance away from the receiver. Other methods such as triangulation can be used if multiple readers are present. Until the drain bolt is replaced, the reader can be programmed to deny authorization to add fresh oil to the engine crankcase.

Additional logic can address special situations such as component reuse and relocation. As an example, when vehicle tires are rotated, each tire would in turn "check out" of the system monitor and then "check in" via an RFID reader in a new location. Tires would thus be indicated as reusable and relocatable parts, such that upon "check in", the component location (state) data would be updated in the table. The following table is an example of what a table update may look like for a tire rotation scenario.

TABLE 3

| RFID Tag ID | Component Description | Part Number | Date in Service | Due Date | State |
|---|---|---|---|---|---|
| 7djte3aljpod046kjp | Ford Radial Tire | BA-83316 | Jan. 22, 2006 | Jan. 22, 2009 | Left front |
| 7dtyaejti458ejei4id | Ford Radial Tire | BA-83316 | Jan. 22, 2006 | Jan. 22, 2009 | Right front |
| 7rlsanm9451snrjkn2 | Ford Radial Tire | BA-83316 | Jan. 22, 2006 | Jan. 22, 2009 | Left rear |
| 7dslhgn385j6j4por4 | Ford Radial Tire | BA-83316 | Jan. 22, 2006 | Jan. 22, 2009 | Right rear |
| 7djte3aljpod046kjp | Ford Radial Tire | BA-83316 | Jul. 20, 2006 | Jan. 22, 2009 | Right rear |
| 7dtyaejti458ejei4id | Ford Radial Tire | BA-83316 | Jul. 20, 2006 | Jan. 22, 2009 | Left rear |
| 7rlsanm9451snrjkn2 | Ford Radial Tire | BA-83316 | Jul. 20, 2006 | Jan. 22, 2009 | Right front |
| 7dslhgn385j6j4por4 | Ford Radial Tire | BA-83316 | Jul. 20, 2006 | Jan. 22, 2009 | Left front |

The loss of signal message is sent to the vehicle computer;

The SLM locates RFID record in the table;

The SLM updates the state field in table;

A new component is installed;

The RFID Reader detects the new component;

A new component message is sent to the vehicle computer;

The SLM adds the new component entry to the table;

The RFID Reader monitors the new component ID; and

Optionally, the vehicle's repair maintenance schedule is updated.

Table 2 is an example of a state change that might occur when an oil filter is replaced on a Ford vehicle. The filter is shown as 'in-service' until it is removed. When the replacement filter is installed, the data record is updated to reflect the new tag ID.

In the case of duplicate entries, the most recently recorded will be regarded as reflecting the current state. For example, there can only be one "Left front" tire, and so the most recent will be understood to be the currently existing tire in the "Left front" location.

This additional logic can also enable a warning system in the event a non-reusable part is reintroduced or a required associated part has not been replaced. As an example, when an oil change is performed, the oil-filter must always be replaced with a new oil-filter. In the event that the oil-change tag is detected as new, but the filter tag has not changed, a warning such as the check-engine light or an ignition kill switch could be activated. Likewise, if the oil-filter were removed, and the same oil filter was reinstalled, the warning would be triggered.

Preferably, the passive RFID tags or other sensors would be embedded or etched into the vehicle parts so that RFID tag

TABLE 2

| RFID Tag ID | Component Description | Part Number | Date in Service | Due Date | State |
|---|---|---|---|---|---|
| 843n567seg169lt65 | Ford air-filter | FA3606 | May 03, 2006 | Nov. 03, 2006 | In-service |
| 42kjouF04439i2k | Ford oil-filter | F04439 | May 03, 2006 | Aug. 03, 2006 | In-Service |
| 2910f7odjutivv8rj1 | Ford front brake pads | FBP3318 | May 03, 2006 | May 03, 2007 | In-Service |
| 42kjouF04439ip2k | Ford oil-filter | F04439 | May 03, 2006 | Aug. 03, 2006 | Removed |
| 42kjouF04439v35r | Ford oil-filter | F04439 | Aug. 01, 2006 | Nov. 01, 2006 | In-Service |

In connection with the oil change, FIG. 3 is an example of the application of the present invention to an engine crankcase provided with a drain bolt (or plug) 42 on the bottom of an oil pan 40. The drain bolt 42 is equipped with an RFID label 12 which is within the range of an RFID reader 14 when the bolt is threaded into place on the oil pan 40. However, removal of the drain bolt outside of the limited range of the reader 14 will provide a non-detection signal to the reader. Similarly, the RFID reader can detect the RFID tag being moved at a distance beyond a preset threshold from the receiver using known RFID distance detection methods, indicating that the drain bolt has been removed. This is achieved by detecting speed of response from the tag wherein the tampering could not occur. In another option, an RFID tag in the form of a label is manufactured such that removal or mutilation of the label would destroy the RFID data.

Data Storage Device-Virtually all modern vehicles contain a nonvolatile storage component associated with the VCC and capable of storing a large amount of data. This device in its original state, in an expanded state, or another independent device can be used with the present invention. This will be more fully detailed in connection with FIG. 4.

User Notification Module-A wide variety of notification methods such as audio and visual indicators and message propagation are well known in the art. This module could optionally use data processed by the Service Logic Module to execute a specific notification method. It could potentially notify multiple parties such as the vehicle owner, the originating dealership, and the manufacturer. As an example, upon completion of an oil change, the on-board computer would be updated and the service data stored, after which, an indicator could be displayed or propagated to inform and update all interested parties.

In one non-limiting implementation, the invention contemplates the use of one or more radio frequency identification (RFID) readers or the like variously located throughout the vehicle. The readers may be positioned in the vehicle so that the aggregate coverage by the one or more RFID readers covers the component parts of the vehicle that are likely to be subject to replacement or repair. The RFID tag could take on many forms. The RFID tag can be a passive tag, an active tag, or a semi-passive tag. With a passive tag, the reader(s) emits an electromagnetic field that induces an electrical current in an antenna of the tag. The electrical current provides power for the tag, for example, for powering an integrated circuit in the tag, which invokes the tag to emit or transmit the information stored in the tag (e.g., in Electrically Erasable Programmable Read-Only Memory, or EEPROM, etc.) via the antenna.

With an active tag, the RFID tag includes an internal power source such as a battery, a solar cell, etc. that powers the integrated circuit, which broadcasts the certification information for reception by an authorized reader tuned to a broadcast frequency. Alternatively or additionally, the RFID tag may be powered from the battery of the vehicle. The RFID tag may also be semi-passive in that an internal battery or the vehicle's battery may provide power to activate the tag, but the field provided by the reader invokes the broadcast of the repair or maintenance information.

It should be understood that the invention is not limited solely to the use of RFID tags as sensors. Other similar devices such as RuBee® long wavelength tags, VLIS visible light identification tags and H-P Memory Spot tags can likewise be utilized as sensors in the practice of this invention. (RUBEE is a trademark of Visible Assets, Inc., in the United States or other countries.)

While shown and described herein as a method and system for tracking maintenance services that have been performed on a vehicle, it is understood that the invention further provides various alternative embodiments. For example, in one embodiment, the invention provides a computer-readable/useable medium that includes computer program code to enable a computer infrastructure to manage the program associated with the RFID tags and readers. To this extent, the computer-readable/useable medium includes program code that implements each of the various process steps of the invention.

An exemplary computerized implementation of the present invention includes the vehicle central computer described above. Communication between the VCC and the various modules and components of the present invention can be achieved via any combination of communications links. For example, the communication links can comprise addressable connections that may utilize any combination of wired and/or wireless transmission methods.

Some or all of the features of the present invention could be deployed, managed or serviced, by a service provider that implements, deploys, and/or perform the functions for or on behalf of the vehicle owner.

Figure 4:
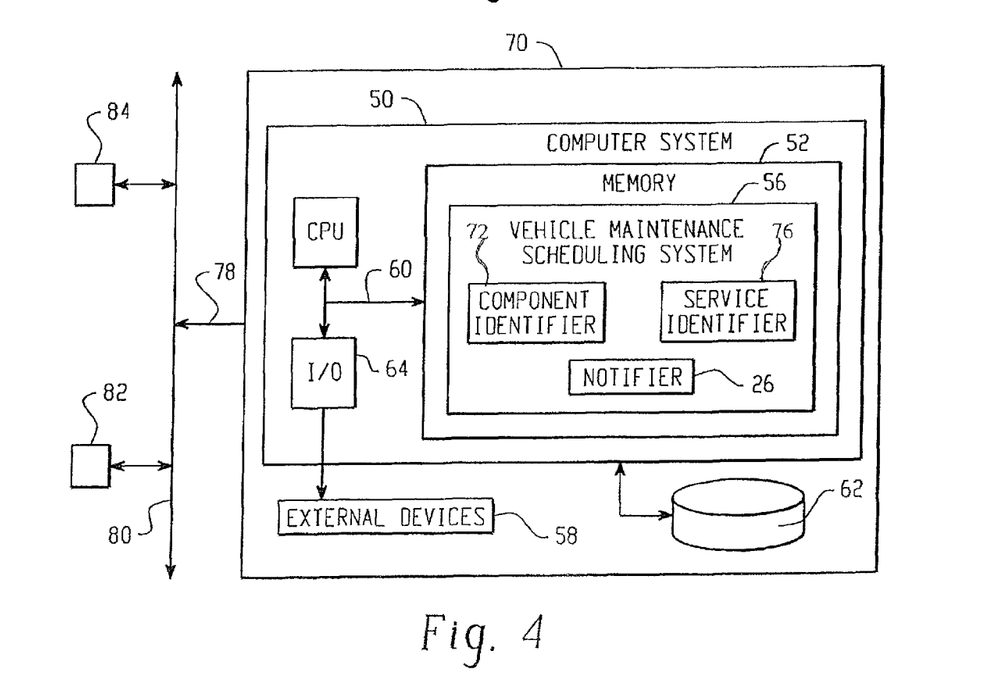
FIG. 4 illustrates an exemplary computerized implementation of the repair and maintenance sensing and tracking system and method of the present invention.

As shown in FIG. 4, a computer infrastructure 70 comprises a computer system 50 having a memory 52, a bus 60, and input/output (I/O) interfaces 64. Further, the computer system 50 is shown in communication with external I/O devices/resources 58 and storage system 62. In general, the processing unit executes computer program code, such as the code to implement the parts detection system, which is stored in the memory 56 and/or database storage system 62. The memory 56 includes software code to support modules such as a notifier 26, a component identifier 72 and a service identifier 76.

While executing computer program code, the processing unit 50 can read and/or write data to/from the memory 56, the storage system 62, and/or the I/O interfaces 64. The bus 60 provides a communication link between each of the components in the computer system. The external devices 58 can comprise any of the previously mentioned components such as the RFID tag, the reader, the data steam converter and the user notification module.

Further, I/O interfaces 64 can comprise any system for exchanging information with one or more of the external devices 58. Still further, it is understood that one or more additional components (e.g., system software, math co-processing unit, etc.) not shown in FIG. 4 can be included in computer system 50. However, if computer system 50 comprises a handheld device or the like, it is understood that one or more of the external devices 58 (e.g., a display) and/or the storage system 62 could be contained within computer system 50, not externally as shown. The computer system can further include a wired or wireless connection 78 to allow it to communicate outside of the vehicle with, for example, the owner 82 or the dealer 84. This capability allows the transfer of updated information for any of the purposes heretofore described.

The storage system 62 can be any type of system (e.g., a database) capable of providing storage for information under the present invention. To this extent, the storage system 62 could include one or more storage devices, such as a magnetic disk drive or an optical disk drive. In another embodiment, the storage system 62 includes data distributed across, for example, a local area network (LAN), wide area network (WAN) or a storage area network (SAN) (not shown). In addition, although not shown, additional components, such as cache memory, communication systems, system software, etc., may be incorporated into computer system 50.

It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), or on one or more data storage portions of a computing device, such as storage system 62 (e.g., a fixed disk, a read-only memory, a random access memory, a cache memory, etc.).

The invention provides a business method that performs the process steps of the invention on a subscription, advertising, and/or fee basis. That is, a service provider could offer to manage the monitoring of the component removal, repair and replacements. In this case, the service provider can create, maintain, support, etc., a computer infrastructure, such as the computer infrastructure 70 (FIG. 4) that performs the process steps of the invention for one or more customers. In return, the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for maintaining a record of service maintenance of a motor vehicle, comprising:

providing a radio frequency reader within a proximity to a first radio frequency tag that is associated with a first serviceable component installed upon a motor vehicle, wherein the proximity is within a field of range of said radio frequency reader to capture a signal from said first radio frequency tag;

in response to the radio frequency reader detecting movement of the first radio frequency tag a distance beyond a preset threshold distance from the radio frequency reader, updating a repair maintenance schedule data table for the motor vehicle that is stored in a storage device by creating a first table entry reporting a state of the first serviceable component as removed from the motor vehicle and comprising a component description and a first unique identification of the first serviceable component, the first table entry indicating at least one of a date in service and a due date for completion of a scheduled maintenance of the vehicle that is associated with the component description;

in response to the radio frequency reader detecting introduction of a second radio frequency tag to a proximity to the radio frequency reader within the preset threshold distance, observing a time of the detected movement of the second radio frequency tag and updating the repair maintenance schedule data table for the motor vehicle by creating a second table entry reporting a state of the second serviceable component as in service on the motor vehicle at the observed time and comprising the component description, a second unique identification of the second serviceable component and a due date for replacement of the second serviceable component that is associated with the second unique identification of the second serviceable component, wherein the second table entry is separate from and in addition to the first table entry in the table; and wherein the creating the second table entry comprises using an original due date for replacement of the second serviceable component from a previous table entry for a previous installation of the second serviceable component on the motor vehicle in response to an indication that the installation is a reuse or a relocation of the second serviceable component on the motor vehicle from the previous installation on the vehicle.

2. The method of claim 1, further comprising:

providing a radio frequency reader within a proximity to a third radio frequency tag that is associated with a third serviceable component installed upon the motor vehicle, wherein the proximity is within a preset threshold distance of a field of range of said radio frequency reader to capture a signal from said third radio frequency tag, and wherein the repair maintenance schedule requires that the third serviceable component be replaced when the first serviceable component is removed; and wherein the method further comprises warning a vehicle user of a failure to remove or replace the third serviceable component in response to the radio frequency reader detecting that the third serviceable component remains proximate to the radio frequency reader within the preset threshold distance throughout an observed time of the removal of the first serviceable component and the observed time of the installation of the second serviceable component.

3. The method of claim 1, wherein the installation of the second serviceable component on the motor vehicle is a reuse or a relocation from a previous installation on the vehicle, the method further comprising:

warning a vehicle user that the installed second serviceable component must be replaced in response to a scheduled maintenance requirement system of the vehicle specifying that serviceable components used for the component description are non-reusable components.

4. The method of claim 3, wherein the radio frequency reader detecting the movement of the first radio frequency tag the distance beyond the preset threshold from the radio frequency reader comprises the radio frequency reader detecting a speed of response from the first radio frequency tag that is dependent upon a distance of the first radio frequency tag away from the radio frequency reader that indicates that the first radio frequency tag is the distance beyond the preset threshold from the radio frequency reader.

5. A method for deploying an application for tracking maintenance of a motor vehicle, comprising:

providing a computer infrastructure comprising a processing unit, a computer readable memory and a computer-readable storage medium, that:

in response to a radio frequency reader within a proximity to a first radio frequency tag that is associated with a first serviceable component installed upon a motor vehicle detecting movement of the first radio frequency tag a distance beyond a preset threshold distance from the radio frequency reader, wherein the proximity is within a field of range of said radio frequency reader to capture a signal from said first radio frequency tag, updates a repair maintenance schedule data table for the motor vehicle that is stored in a storage device by creating a first table entry reporting a state of the first serviceable component as removed from the motor vehicle and comprising a component description and a first unique identification of the first serviceable component, the first table entry indicating at least one of a date in service and a due date for completion of a scheduled maintenance of the vehicle that is associated with the component description;

in response to the radio frequency reader detecting introduction of a second radio frequency tag to a proximity to the radio frequency reader within the preset threshold distance, observes a time of the detected movement of the second radio frequency tag and updates the repair maintenance schedule data table for the motor vehicle by creating a second table entry reporting a state of the second serviceable component as in service on the motor vehicle at the observed time and comprising the component description, a second unique identification of the second serviceable component and a due date for replacement of the second serviceable component that is associated with the second unique identification of the second serviceable component, wherein the second table entry is separate from and in addition to the first table entry in the table; and creates the second table entry by using an original due date for replacement of the second serviceable component from a previous table entry for a previous installation of the second serviceable component on the motor vehicle in response to an indication that the installation is a reuse or a relocation of the second serviceable component on the motor vehicle from the previous installation on the vehicle.

6. The method of claim 5, wherein the computer infrastructure further, in response to a radio frequency reader within a proximity to a third radio frequency tag that is associated with a third serviceable component installed upon the motor vehicle, wherein the proximity is within a preset threshold distance of a field of range of said radio frequency reader, capturing a signal from said third radio frequency tag, and to a repair maintenance schedule requirement that the third serviceable component be replaced when the first serviceable component is removed:

warns a vehicle user of a failure to remove or replace the third serviceable component in response to the radio frequency reader detecting that the third serviceable component remains proximate to the radio frequency reader within the preset threshold distance throughout an observed time of the removal of the first serviceable component and the observed time of the installation of the second serviceable component.

7. The method of claim 5, wherein the installation of the second serviceable component on the motor vehicle is a reuse or a relocation from a previous installation on the vehicle; and wherein the computer infrastructure further warns a vehicle user that the installed second serviceable component must be replaced in response to a scheduled maintenance requirement system of the vehicle specification that serviceable components used for the component description are non-reusable components.

8. The method of claim 7, wherein the computer infrastructure further, in response to two different table entries indicating installation of two different components each having the same component description and different observed times and different unique identifications, reflects the unique identification of a one of the two components having a most recent observed time as a currently installed component.

9. An article of manufacture, comprising:

a computer readable tangible storage medium having computer readable program code embodied therewith, the computer readable program code comprising instructions that, when executed by a computer processor, cause the computer processor to:

in response to a radio frequency reader within a proximity to a first radio frequency tag that is associated with a first serviceable component installed upon a motor vehicle detecting movement of the first radio frequency tag a distance beyond a preset threshold distance from the radio frequency reader, wherein the proximity is within a field of range of said radio frequency reader to capture a signal from said first radio frequency tag, update a repair maintenance schedule data table for the motor vehicle that is stored in a storage device by creating a first table entry reporting a state of the first serviceable component as removed from the motor vehicle and comprising a component description and a first unique identification of the first serviceable component, the first table entry indicating at least one of a date in service and a due date for completion of a scheduled maintenance of the vehicle that is associated with the component description;

in response to the radio frequency reader detecting introduction of a second radio frequency tag to a proximity to the radio frequency reader within the preset threshold distance, observe a time of the detected movement of the second radio frequency tag and update the repair maintenance schedule data table for the motor vehicle by creating a second table entry reporting a state of the second serviceable component as in service on the motor vehicle at the observed time and comprising the component description, a second unique identification of the second serviceable component and a due date for replacement of the second serviceable component that is associated with the second unique identification of the second serviceable component, wherein the second table entry is separate from and in addition to the first table entry in the table; and create the second table entry by using an original due date for replacement of the second serviceable component from a previous table entry for a previous installation of the second serviceable component on the motor vehicle in response to an indication that the installation is a reuse or a relocation of the second serviceable component on the motor vehicle from the previous installation on the vehicle.

10. The article of manufacture of claim 9, wherein the computer readable program code instructions, when executed by the computer processor, further cause the computer processor to, in response to a radio frequency reader within a proximity to a third radio frequency tag that is associated with a third serviceable component installed upon the motor vehicle, wherein the proximity is within a preset threshold distance of a field of range of said radio frequency reader, capturing a signal from said third radio frequency tag, and to a repair maintenance schedule requirement that the third serviceable component be replaced when the first serviceable component is removed:

warn a vehicle user of a failure to remove or replace the third serviceable component in response to the radio frequency reader detecting that the third serviceable component remains proximate to the radio frequency reader within the preset threshold distance throughout an observed first time of the removal of the first serviceable component and the observed time of the installation of the second serviceable component.

11. The article of manufacture of claim 9, wherein the installation of the second serviceable component on the motor vehicle is a reuse or a relocation from a previous installation on the vehicle; and wherein the computer readable program code instructions, when executed by the computer processor, further cause the computer processor to warn a vehicle user that the installed second serviceable component must be replaced in response to a scheduled maintenance requirement system of the vehicle specifying that serviceable components used for the component description are non-reusable components.

12. The article of manufacture of claim 11, wherein the computer readable program code instructions, when executed by the computer processor, further cause the computer processor to, in response to two different table entries indicating installation of two different components each having the same component description and different observed times and different unique identifications, reflect the unique identification of a one of the two components having a most recent observed time as a currently installed component.

13. A system, comprising:
- a processing unit that is in communication with a computer readable memory, a tangible computer-readable storage medium, and a radio frequency reader;
- wherein the radio frequency reader is installed upon a motor vehicle within a proximity to a first radio frequency tag that is associated with a first serviceable component that is installed upon the motor vehicle, and wherein the proximity to the first frequency tag is within a preset threshold distance of a field of range of said radio frequency reader to capture a signal from said first radio frequency tag; and
- wherein the processing unit, when executing program instructions stored on the tangible computer-readable storage medium via the computer readable memory:
- in response to the radio frequency reader communicating a detected movement of the first radio frequency tag a distance beyond a preset threshold distance from the radio frequency reader, updates a repair maintenance schedule data table for the motor vehicle that is stored in a storage device in communication with the processing unit by creating a first table entry reporting a state of the first serviceable component as removed from the motor vehicle, wherein the first table entry comprises a component description and a first unique identification of the first serviceable component and indicates at least one of a date in service and a due date for completion of a scheduled maintenance of the vehicle that is associated with the component description;
- in response to the radio frequency reader detecting introduction of a second radio frequency tag to a proximity to the radio frequency reader within the preset threshold distance, observes a time of the detected movement of the second radio frequency tag and updates the repair maintenance schedule data table for the motor vehicle by creating a second table entry reporting a state of the second serviceable component as in service on the motor vehicle at the observed time and comprising the component description, a second unique identification of the second serviceable component and a due date for replacement of the second serviceable component that is associated with the second unique identification of the second serviceable component, wherein the second table entry is separate from and in addition to the first table entry in the table; and
- creates the second table entry by using an original due date for replacement of the second serviceable component from a previous table entry for a previous installation of the second serviceable component on the motor vehicle in response to an indication that the installation is a reuse or a relocation of the second serviceable component on the motor vehicle from the previous installation on the vehicle.

14. The system of claim 13, wherein the radio frequency reader is installed upon the motor vehicle within a proximity to a third radio frequency tag that is associated with a third serviceable component installed upon the motor vehicle, wherein the proximity to the third radio frequency tag is within a preset threshold distance of a field of range of said radio frequency reader to capture a signal from said third radio frequency tag; and
- wherein the processing unit, when executing the program instructions stored on the tangible computer-readable storage medium via the computer readable memory, further warns a vehicle user of a failure to remove or replace the third serviceable component in response to the radio frequency reader communicating that the third serviceable component remains proximate to the radio frequency reader within the preset threshold distance throughout an observed time of the removal of the first serviceable component and the observed time of the installation of the second serviceable component, wherein the repair maintenance schedule requires that the third serviceable component be replaced when the first serviceable component is removed.

15. The system of claim 13, wherein the installation of the second serviceable component on the motor vehicle is the reuse or the relocation from the previous installation on the vehicle; and
- wherein the processing unit, when executing the program instructions stored on the tangible computer-readable storage medium via the computer readable memory, further warns a vehicle user that the installed second serviceable component must be replaced in response to a scheduled maintenance requirement system of the vehicle specifying that serviceable components used for the component description are non-reusable components.

16. The system of claim 15, wherein the processing unit, when executing the program instructions stored on the tangible computer-readable storage medium via the computer readable memory, further, in response to two different table entries indicating installation of two different components each having the same component description and different observed times and different unique identifications, creates a table entry reflecting the unique identification of a one of the two components having a most recent observed time as a currently installed component.

17. The system of claim 16, wherein the radio frequency reader detects the movement of the first radio frequency tag the distance beyond the preset threshold from the radio frequency reader in response to detecting a speed of response from the first radio frequency tag that is dependent upon a distance of the first radio frequency tag away from the radio frequency reader and that indicates that the first radio frequency tag is the distance beyond the preset threshold from the radio frequency reader.

* * * * *